United States Patent
Ishikawa et al.

(10) Patent No.: US 6,767,929 B2
(45) Date of Patent: Jul. 27, 2004

(54) PROCESS FOR PRODUCING POLYURETHANE

(75) Inventors: Atsushi Ishikawa, Wakayama (JP); Mitsuru Sakai, Wakayama (JP); Masayoshi Morii, Wakayama (JP)

(73) Assignee: Kao Corporation, Tokyo (JP)

(*) Notice: Subject to any disclaimer, the term of this patent is extended or adjusted under 35 U.S.C. 154(b) by 51 days.

(21) Appl. No.: 10/168,077

(22) PCT Filed: Dec. 14, 2000

(86) PCT No.: PCT/JP00/08858

§ 371 (c)(1),
(2), (4) Date: Jun. 17, 2002

(87) PCT Pub. No.: WO01/44337

PCT Pub. Date: Jun. 21, 2001

(65) Prior Publication Data

US 2003/0004220 A1 Jan. 2, 2003

(30) Foreign Application Priority Data

Dec. 17, 1999 (JP) .......................................... 11/359818
Dec. 17, 1999 (JP) .......................................... 11/359819

(51) Int. Cl.[7] .............................. C08J 9/04; B01J 31/18
(52) U.S. Cl. ...................... 521/118; 502/167; 502/172; 502/200; 521/117; 521/128; 521/129; 521/163; 521/164; 521/170; 521/174
(58) Field of Search ................................. 521/129, 118, 521/164, 167, 170, 174, 117, 128, 163; 502/200; 564/463, 503, 504, 505, 511

(56) References Cited

U.S. PATENT DOCUMENTS 4,714,719 A   12/1987  Yamasaki et al.
5,977,198 A * 11/1999  Hettel et al. .................. 521/174
5,998,494 A * 12/1999  Hamilton ....................... 521/166
6,306,918 B1  10/2001  Sakai et al.
6,331,650 B1 * 12/2001  Tokuyasu et al. ............ 564/463

FOREIGN PATENT DOCUMENTS

| EP | 0 469 545 A2 | 2/1992 |
| EP | 1 138 708 A1 | 10/2001 |
| JP | 61-252219 | 11/1986 |
| JP | 7-53659 | 2/1995 |
| JP | 2001-26627 | 1/2001 |

* cited by examiner

Primary Examiner—John M. Cooney, Jr.
(74) Attorney, Agent, or Firm—Birch, Stewart, Kolasch & Birch, LLP

(57) ABSTRACT

A catalyst for producing a polyurethane, comprising a dialkylaminoalkyl alcohol represented by the formula (I):

$$R^1R^2N\text{—}X\text{—}OH \qquad (I)$$

wherein each of $R^1$ and $R^2$ is independently an alkyl group having 1 to 4 carbon atoms; and X is a branched alkylene group having 4 to 8 carbon atoms; a process for producing a polyurethane, comprising reacting a polyol component with an isocyanate component in the presence of the above-mentioned catalyst for producing a polyurethane; and a process for producing a polyurethane foam, comprising reacting a polyol component with an isocyanate component in the presence of the above-mentioned catalyst for producing a polyurethane, and a compound having a primary amino group and a tertiary amino group in its molecule, and a blowing agent. The polyurethane can be used as heat insulating materials for construction materials, electric refrigerators, refrigerated warehouses, baths and the like, interior materials for automobiles, furnishings, cushioning materials for beddings, various sealing materials and the like.

10 Claims, 1 Drawing Sheet

PROCESS FOR PRODUCING POLYURETHANE

This application is the national phase under 35 U.S.C. §371 of PCT International Application No. PCT/JP00/08858 which has an International filing date of Dec. 14, 2000, which designated the United States of America.

TECHNICAL FIELD

The present invention relates to a catalyst for producing a polyurethane, and a process for producing a polyurethane in which the catalyst is used, such as a flexible, rigid or semi-rigid polyurethane foam or a polyurethane elastomer. More specifically, the present invention relates to a process for producing a polyurethane such as a polyurethane foam which can be used as heat insulating materials for construction materials, electric refrigerators, refrigerated warehouses, baths and the like, interior materials for automobiles, furnishings, cushioning materials for beddings, various sealing materials and the like, and a catalyst for producing a polyurethane used therefor.

BACKGROUND ART

As a catalyst used in the production of a polyurethane, N,N,N',N'-tetramethylethylenediamine and N,N,N',N'-tetramethylpropylenediamine have been widely used because of their appropriate catalytic activity and excellent moldability. However, there are serious defects in public health when the catalysts are used since the catalysts not only exhibit bad stimulative smells but also generate eye rainbow (the state where a rainbow is observed) due to the vapor of the catalyst during the operation for the production.

In order to eliminate these defects, there has been proposed a tertiary amine catalyst such as 1,4-diazabicyclo[2.2.2]octane or N,N,N',N'-tetramethylhexamethylenediamine. The effects due to the catalysts can be recognized to some extent. However, it could not yet have been said that the effects are sufficient. Also, since these tertiary amine catalysts would not be incorporated into the polyurethane via a chemical bond during the urethanation, there are some defects in the catalysts such that there occur inconvenient results such as a so-called "vinyl-staining" which is caused by the discoloration of a vinyl chloride resin sheet used as a substrate, and a so-called "fogging" meaning the fogging of window glass of an automobile due to the catalyst vapor diffused from the polyurethane.

As an amine catalyst which is incorporated into the polyurethane during the urethanation, there has been proposed a tertiary amine catalyst having in its molecule a hydroxyl group and an amino group reactive with isocyanate group. When the tertiary amine catalyst is used, the problems in vinyl-staining and fogging are solved. However, the molecular structure of the polyurethane would be changed by the amine catalyst, so that there are some defects in heat resistance such that the strength is lowered especially when the polyurethane is exposed to an atmosphere having a high temperature for a long period of time, and that the polyurethane is colored.

On the other hand, a rigid polyurethane foam has been used as heat insulating materials for construction materials, electric refrigerators, refrigerated warehouses, baths and pipes because of its excellent heat insulation.

When the polyurethane foam is used, for instance, as heat insulating materials for house or building construction materials, the polyurethane foam has been produced by mixing a component comprising a polyol as a main component with a component comprising a polyisocyanate as a main component, spraying the resulting mixture to a desired site such as wall surface or ceiling in the construction site of a house or building with a spray machine or the like to foam, and curing the foam.

When the polyurethane foam is formed in a manner as described above, peculiar strong odor based on the used tertiary amine catalyst worsens the working environment. Moreover, since the unreacted tertiary amine catalyst remains in the polyurethane foam even after molding, there are some problems in public health such as odor caused by the release and dispersion of the tertiary amine catalyst from the polyurethane foam. Recently, as a catalyst for producing a polyurethane which causes little problem in public health, there has been proposed a tertiary amine catalyst having a hydroxyl group in its molecule for the purpose of the avoidance of vinyl-staining and fogging (Japanese Patent Laid-Open Nos. Sho 62-115017 and Sho 61-252219).

When the tertiary amine catalyst having a hydroxyl group in its molecule is used in the production of the polyurethane foam, the problem regarding odor is eliminated. However, since the reactivity of the polyol component with the isocyanate component used in the production of the polyurethane foam is low at low temperatures, a long period of time is required for the production. Especially, when the polyurethane foam is formed by means of spraying, problems such as dripping would be caused. Also, there are some defects such that heat of the polyurethane foam generated during the production is robbed off by the air, and that the reaction is less likely to proceed, so that the compressive strength is lowered and its dimensional stability is lowered at low temperatures.

An object of the present invention is to provide a catalyst for producing a polyurethane exhibiting little odor, and a process for producing a polyurethane foam excellent in vinyl-staining resistance, fogging resistance and heat resistance, using the catalyst for producing a polyurethane.

Another object of the present invention is to provide a process capable of rapidly producing a polyurethane foam excellent in dimensional stability even under low-temperature surroundings with the generation of little odor based on the catalyst for producing a polyurethane.

These and other objects of the present invention will be apparent from the following description.

DISCLOSURE OF INVENTION

Specifically, the present invention relates to (1) a catalyst for producing a polyurethane, comprising a dialkylaminoalkyl alcohol (hereinafter referred to as "DAAA") represented by the formula (I):

$$R^1R^2N-X-OH \qquad (I)$$

wherein each of $R^1$ and $R^2$ is independently an alkyl group having 1 to 4 carbon atoms; and X is a branched alkylene group having 4 to 8 carbon atoms;

(2) a process for producing a polyurethane, comprising reacting a polyol component with an isocyanate component in the presence of a catalyst for producing a polyurethane, comprising the DAAA; and (3) a process for producing a polyurethane foam, comprising reacting a polyol component with an isocyanate component in the presence of a catalyst for producing a polyurethane, comprising the DAAA, and a compound having a primary amino group and a tertiary amino group in its molecule (hereinafter referred to as "FTA compound") and a blowing agent.

BEST MODE FOR CARRYING OUT THE INVENTION

Figure 1:
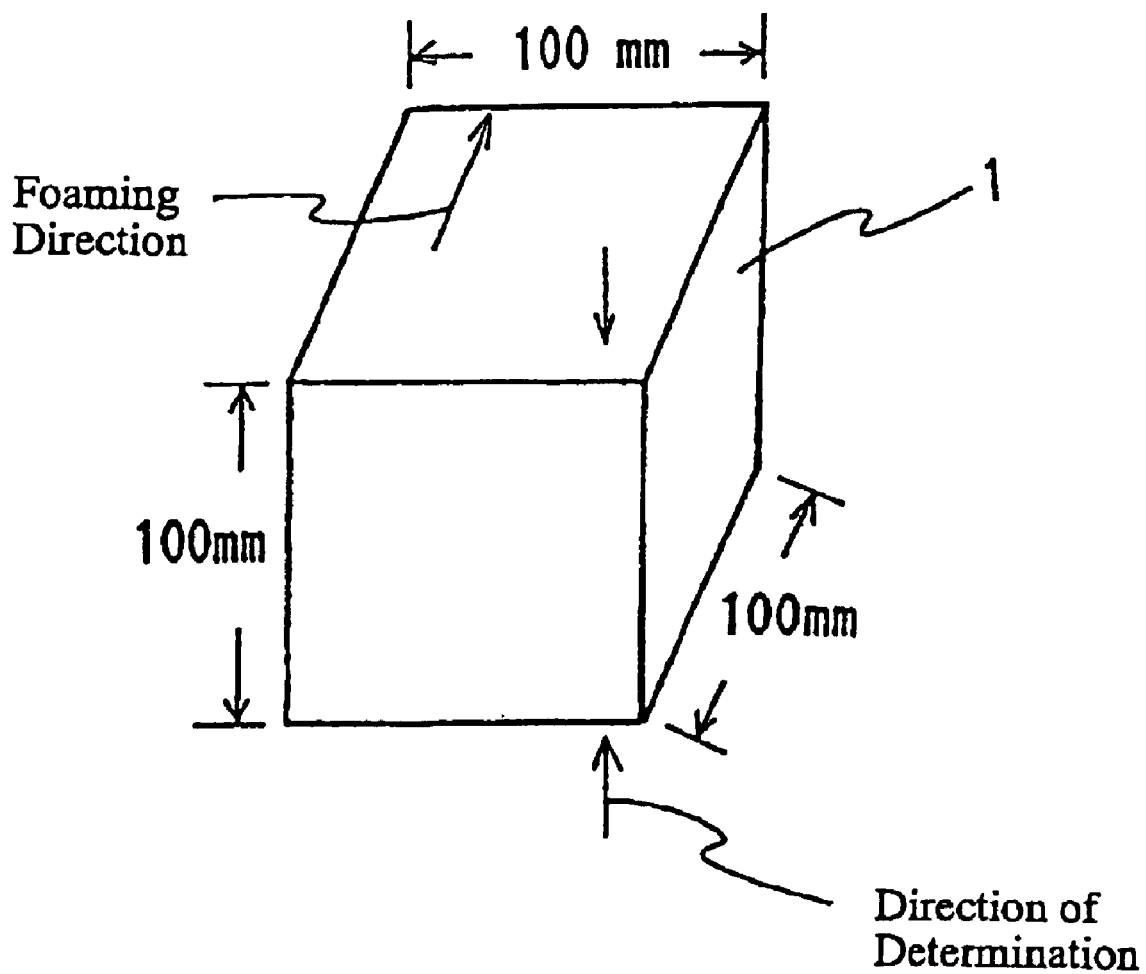
FIG. 1 is a schematic explanatory view of a test piece of a polyurethane foam used in the determination of dimensional stability at low temperatures.

The catalyst for producing a polyurethane, comprising a DAAA represented by the formula (I) generates little odor, and has excellent characteristics of imparting vinyl-staining resistance, fogging resistance and heat resistance to the polyurethane obtained.

Incidentally, the term "comprising" includes two concepts: the one is a case where only the DAAA is used, and the other is a case where the other catalyst for producing a polyurethane is contained together with the DAAA within a range which would not hinder the object of the present invention.

In the formula (I), each of $R^1$ and $R^2$ is independently an alkyl group having 1 to 4 carbon atoms. It is preferable that each of $R^1$ and $R^2$ is methyl group from the viewpoint of catalytic activity.

X is a branched alkylene group having 4 to 8 carbon atoms. Among them, those having no branched chain at alpha and beta positions of the nitrogen atom are preferable from the viewpoint of catalytic activity.

As preferred concrete examples of the DAAA, there can be cited 5-dimethylamino-3-methyl-1-pentanol, 4-dimethylamino-2-methyl-1-butanol, 4-dimethylamino-2,2-dimethyl-1-butanol, 5-dimethylamino-3,3-dimethyl-1-pentanol, 6-dimethylamino-2-ethyl-1-hexanol, and the like. These can be used alone or in admixture of at least two kinds. Among them, 5-dimethylamino-3-methyl-1-pentanol is especially preferable, from its high yield in preparation, and its inexpensive preparation.

The DAAA can be readily prepared by reacting a corresponding branched alkanediol with a dialkylamine.

Especially, 5-dimethylamino-3-methyl-1-pentanol can be prepared by reacting 3-methyl-1,5-pentanediol as a starting material with dimethylamine. However, a large amount of bis(1,5-dimethylamino)-3-methylpentane in which dimethylamino groups are bonded to the two hydroxyl groups of 3-methyl-1,5-pentanediol is formed as a by-product of 5-dimethylamino-3-methyl-1-pentanol, thereby lowering its yield. However, when 5-hydroxy-3-methyl-1-pentanal which is industrially readily available is used as a starting material, 5-dimethylamino-3-methyl-1-pentanol can be prepared in a high yield since 5-dimethylamino-3-methyl-1-pentanol in which dimethylamino group is bonded only to the aldehyde, can be selectively prepared by reacting the aldehyde with dimethylamine.

The amount of the catalyst for producing a polyurethane comprising DAAA cannot be absolutely determined because the amount of the catalyst varies depending upon the kind of the polyurethane. It is desired that the amount of the catalyst for producing a polyurethane is usually at least 0.3 parts by weight, preferably at least 0.5 parts by weight based on 100 parts by weight of the polyol component which is a starting material of the polyurethane, from the viewpoint of increasing the reactivity of the polyol component with the isocyanate component. Also, it is desired that the amount of the catalyst for producing a polyurethane is at most usually 10 parts by weight, preferably at most 8 parts by weight based on 100 parts by weight of the polyol component, from the viewpoint of maintaining the strength of the polyurethane. Therefore, in view of the above circumstances, the desired amount of the catalyst for producing a polyurethane is 0.3 to 10 parts by weight, preferably 0.5 to 8 parts by weight based on 100 parts by weight of the polyol component.

The kind of the polyurethane to which the catalyst for producing a polyurethane comprising the DAAA is applicable is not limited to specified ones. As the polyurethane, there can be cited flexible, rigid and semi-rigid polyurethane foams, polyurethane elastomers, and the like, but the present invention is not limited only to those exemplified ones. Among them, the flexible, rigid and semi-rigid polyurethane foams are preferable.

In addition, when a polyurethane foam is produced for another purpose of the present invention, it is preferable to use a catalyst for producing a polyurethane comprising the DAAA and the FTA compound.

When the catalyst for producing a polyurethane comprising the DAAA and the FTA compound is used, little odor based on the catalyst would be generated during the production of a polyurethane foam. Moreover, there can be exhibited an excellent effect such that a polyurethane foam being excellent in dimensional stability can be rapidly produced even in the low-temperature surroundings as in winter season. The reason why the above excellent effect is exhibited would be presumably based on the facts that the DAAA suppresses the odor of the FTA compound by using the DAAA together with the FTA compound, and that the reactivity is improved at low temperatures and the cross-linking density is increased by the synergistic effects of the combined use of these compounds, so that the dimensional stability is improved at low temperatures.

As described above, when the catalyst for producing a polyurethane comprising the DAAA and the FTA compound is used, these excellent effects are exhibited. Therefore, even in low-temperature surroundings as in winter season, a rigid polyurethane foam can be produced by directly spraying a mixture containing the catalyst to a desired site such as wall surface or ceiling in a construction site such as house, building or the like with a spraying machine or the like to foam, and curing the foam, and the formed rigid polyurethane foam can be suitably used as a heat insulating material for construction materials and the like. Moreover, since the resulting polyurethane foam generates little odor based on the catalyst for producing a polyurethane, when the catalyst is used for the production of a semi-rigid polyurethane foam, the obtained semi-rigid polyurethane foam can be suitably used, for instance, for interior materials for automobiles such as headrests.

As representative examples of the FTA compound, there can be cited a compound represented by the formula (II):

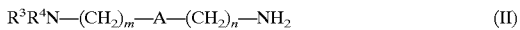

$$R^3R^4N-(CH_2)_m-A-(CH_2)_n-NH_2 \qquad (II)$$

wherein each of $R^3$ and $R^4$ is independently an alkyl group having 1 to 4 carbon atoms, or may be bonded to each other to form a 3- to 6-membered nitrogen atom-containing heterocyclic group; A is oxygen atom or a single bond, and when A is oxygen atom, each of m and n is independently an integer of 2 to 6, and when A is a single bond, each of m and n is an integer satisfying m+n=2 to 8.

As concrete examples of the FTA compound represented by the formula (II), there can be cited dialkylaminoalkylamines such as 3-dimethylaminopropylamine, 3-diethylaminopropylamine, 3-dipropylaminopropylamine, 4-dimethylaminobutylamine, 6-dimethylaminohexylamine, 3-(2-dimethylaminoethoxy)propylamine, 2-dibutylaminoethylamine and 8-dimethylaminooctylamine; heterocyclic aminoalkylamines such as 2-(1-aziridinyl)ethylamine, 3-(1-pyrrolidinyl)-1-propylamine, N-(2-aminoethyl)piperazine, N-methyl-N'-(2-aminoethyl)piperazine, 1,4-bis(2-aminoethyl)piperazine, N-(3-aminopropyl)piperazine, N-methyl-N'-(3-aminopropyl)piperazine, 1,4-bis(3-aminopropyl)piperazine, 2-(1-morpholino)ethylamine and 3-(1-morpholino)propylamine; and the like. These can be used alone or in admixture of at least two kinds. Among them, at least one compound selected from the group consisting of 3-dimethylaminopropylamine, 4-dimethylaminobutylamine, 6-dimethylaminohexylamine and 3-(2-dimethylaminoethoxy)propylamine, especially 3-dimethylaminopropylamine can be suitably used, from the viewpoint that very little odor is generated when used together with the DAAA.

The DAAA/FTA compound [weight ratio] is preferably 5/95 to 95/5, more preferably 10/90 to 80/20, from the viewpoint of preventing the odor and the viewpoint of improving the reactivity.

In addition, it is desired that the total amount of the DAAA and the FTA compound is at least 0.5 parts by weight, preferably at least 1 part by weight based on 100 parts by weight of the polyol component, from the viewpoint of increasing the reactivity of the polyol component with the isocyanate component and the viewpoint of improving the dimensional stability at low temperatures. Also, it is desired that the total amount of the DAAA and the FTA compound is at most 10 parts by weight, preferably at most 8 parts by weight based on 100 parts by weight of the polyol component, from the viewpoint of maintaining the strength of the polyurethane foam. Therefore, in view of the above circumstances, it is desired that the total amount is 0.5 to 10 parts by weight, preferably 1 to 8 parts by weight based on 100 parts by weight of the polyol component.

The other catalyst for producing a polyurethane may be used within a range which would not hinder the object of the present invention. It is preferable that the other catalyst for producing a polyurethane foam is one having a boiling point of at least 130° C. from the viewpoint of suppressing its evaporation or volatilization since its internal temperature becomes 100° to 130° C. or so during the production of polyurethane foam.

As the other catalysts for producing a polyurethane, there can be cited, for instance, tertiary amine catalysts such as 1,4-diazabicyclo[2.2.2]octane, 2-methyl-1,4-diazabicyclo[2.2.2]octane, N-ethylmorpholine, N-(dimethylaminoethyl)morpholine, N,N,N',N'-tetramethylpropylenediamine, N,N,N',N'-tetramethylhexamethylenediamine, N,N',N'-trimethylaminoethylpiperazine, N,N-dimethylcyclohexylamine, N,N-dimethylbenzylamine, N,N,N',N'',N''-pentamethyldiethylenetriamine, bis(2-dimethylaminoethyl) ether, 1,8-diazabicyclo[5.4.0]undecene-7, N,N',N''-tris(3-dimethylaminopropyl)hexahydro-s-triadine, 6-dimethyl-amino-1-hexanol, N,N-dimethylethanolamine, N,N-dimethylaminoethoxyethanol and N,N-dimethylamino-ethoxyethoxyethanol, derivatives thereof, salts thereof with an acid such as a carboxylic acid or carbonic acid; organometallic compounds represented by organotin compounds; and the like.

For the purpose of imparting anti-flaming property to a polyurethane foam, the catalyst can be used together with a catalyst for producing a polyisocyanurate represented by a potassium salt such as potassium acetate or potassium octylate, or a quaternary ammonium salt.

The amount of the other catalyst for producing a polyurethane and the amount of the catalyst for producing a polyisocyanurate are not limited to specified ones, and may be appropriately adjusted within a range which would not hinder the object of the present invention.

The polyurethane can be produced by reacting the polyol component with the isocyanate component in the presence of the catalyst for producing a polyurethane comprising the DAAA. Among the polyurethanes, when a polyurethane foam is produced, a polyurethane foam can be produced by reacting a polyol component with an isocyanate component in the presence of the catalyst for producing a polyurethane comprising the DAAA, a blowing agent, and, as occasion demands, a surfactant.

The polyol component is not limited to specified ones, and may be any of those conventionally used ones during the production of a polyurethane.

As the polyol component, there can be cited polyester-polyols and polyether-polyols.

The polyester-polyol can be prepared by a condensation reaction of a dicarboxylic acid with a polyhydric alcohol.

As the dicarboxylic acid used for the polyester-polyol, there can be cited saturated aliphatic dicarboxylic acids such as glutaric acid, adipic acid, pimelic acid, suberic acid, azelaic acid and sebacic acid; saturated alicyclic dicarboxylic acids such as cyclohexanedicarboxylic acid; aromatic dicarboxylic acids such as phthalic acid, terephthalic acid and isophthalic acid; unsaturated aliphatic dicarboxylic acids such as maleic acid, fumaric acid and itaconic acid; halogen-containing dicarboxylic acids such as tetrabromophthalic acid; ester-formable derivatives thereof; acid anhydrides thereof; and the like. These can be used alone or in admixture of at least two kinds. Incidentally, the dicarboxylic acid may contain a polybasic acid having at least three functional groups, such as trimellitic acid or pyromellitic acid as desired.

As the polyhydric alcohol constituting the polyester-polyol, there can be cited ethylene glycol, diethylene glycol, propylene glycol, 1,4-butanediol, 1,5-pentanediol, methylpentanediol-1,6-hexanediol, trimethylolpropane, glycerol, pentaerythritol, diglycerol, dextrose, sorbitol, and the like. These can be used alone or in admixture of at least two kinds.

As representative examples of the polyether-polyol, there can be cited polyoxypropylene-polyols, polyoxytetramethylene glycols, mixtures thereof, and the like.

The polyoxypropylene-polyol can be prepared by a ring-opening addition reaction of an alkylene oxide such as ethylene oxide, propylene oxide, 1,2-butylene oxide, 1,3-butylene oxide or styrene oxide, using a compound having at least two active hydrogen-containing groups as a starting material.

As the compound having at least two active hydrogen-containing groups, there can be cited dihydric alcohols such as ethylene glycol, diethylene glycol, propylene glycol, dipropylene glycol, neopentyl glycol, 1,4-butanediol and 1,6-hexanediol; polyhydric alcohols having at least three hydroxyl groups such as glycerol, trimethylolpropane, pentaerythritol, diglycerol, dextrose, sorbitol and sucrose; polyphenols such as resorcinol, hydroquinone and bisphenol A; polyamines such as ethylenediamine, tolylenediamine, 1,3-propanediamine and isophoronediamine; alkanolamines such as diethanolamine and triethanolamine; modified compounds thereof; and the like. These can be used alone or in admixture of at least two kinds.

The polyoxytetramethylene glycol can be prepared by ring-opening polymerization of tetrahydrofuran.

As the polyol component, the above-mentioned polyester-polyols and polyether-polyols can be used alone or in admixture of at least two kinds.

The number of the functional groups and the hydroxyl value of the polyol component cannot be absolutely determined, because the number of the functional groups and the hydroxyl value differ depending upon the kinds of the desired polyurethane and required physical properties, and the like. Therefore, it is desired that the number of the functional groups and the hydroxyl value are appropriately selected depending upon the kinds of the desired polyurethane and required physical properties. Especially, when a rigid polyurethane foam is produced, it is preferable that the number of the functional groups in the polyol component is 2 to 8, and that its hydroxyl value is 250 to 700. Also, when a flexible polyurethane foam and a semi-rigid polyurethane foam are produced, it is preferable that the number of the functional groups in the polyol component is 2 to 4, and that its hydroxyl value is 10 to 200.

As the isocyanate component, there can be cited, for instance, aromatic polyisocyanates such as 2,4-tolylene diisocyanate, 2,6-tolylene diisocyanate, 4,4'-diphenyl-methane diisocyanate, 2,2'-diphenylmethane diisocyanate, 2,4'-diphenylmethane diisocyanate, polymethylenepolyphenylene polyisocyanate, xylylene diisocyanate and naphthylene diisocyanate; aliphatic polyisocyanates such as hexamethylene diisocyanate and lysine diisocyanate; alicyclic polyisocyanates such as hydrogenated diphenylmethane diisocyanate, hydrogenated tolylene diisocyanate and isophorone diisocyanate; modified compounds of the above-mentioned polyisocyanates containing at least one bond such as urethane bond, carbodiimide bond, uretoimine bond, allophanate bond, urea bond, biuret bond and isocyanurate bond. These can be used alone or in admixture of at least two kinds.

It is preferable that the proportion of the polyol component to the isocyanate component is adjusted so that the isocyanate index usually becomes 95 to 300. Also, it is especially preferable that the proportion of the polyol component to the isocyanate component is adjusted so that the isocyanate index becomes 95 to 120 with the exception of a particular case where the catalyst is used together with a catalyst for producing a polyisocyanurate.

The blowing agent used in the production of a polyurethane foam includes water; low-boiling point hydrocarbons such as isopentane, normal pentane and cyclopentane; gases such as nitrogen gas, air and carbon dioxide; HCFC-141b, HCFC-142b, HCFC-22, HFC-134a, HFC-152a, HFC-245fa, HFC-245ca, HFC-236ea, HFC-365mfc, and the like. These can be used alone or in admixture of at least two kinds.

The amount of the blowing agent cannot be absolutely determined, because the amount of the blowing agent differs depending upon its kinds and the density of the desired polyurethane foam. Therefore, it is desired that the amount of the blowing agent is appropriately adjusted depending upon the kinds of these blowing agents and the like.

When a polyurethane foam is produced, a surfactant can be used as occasion demands. The surfactant may be any of those generally used in the production of a polyurethane foam. As representative examples of the surfactant, there can be cited silicone surfactants such as dimethylpolysiloxane and polyoxyalkylene-modified dimethylpolysiloxane; anionic surfactants such as salts of fatty acids, salts of sulfuric acid esters, salts of phosphoric acid esters and sulfonates; and the like.

The amount of the surfactant cannot be absolutely determined, because the amount of the surfactant differs depending upon its kinds and the density of the desired polyurethane foam. Therefore, it is desired that the amount of the surfactant is appropriately adjusted depending upon the kinds of these surfactants and the like.

Moreover, there can be employed optional components other than those mentioned above, for instance, other auxiliaries such as cross-linking agents, stabilizers, pigments, flame retardants and fillers within a range which would not hinder the object of the present invention.

The cross-linking agent includes low-molecular weight compounds having at least two active hydrogen-containing groups which are reactive with hydroxyl group, primary amino group, secondary amino group, or other isocyanate groups. As its examples, there can be cited polyhydric alcohols such as ethylene glycol, diethylene glycol, propylene glycol, dipropylene glycol, 1,4-butanediol, 1,6-hexanediol, neopentyl glycol, glycerol, trimethylolpropane, triethanolamine and alkylene oxide adducts of bisphenol A; polyamines such as diethyltoluenediamine, chlorodiaminobenzene, ethylenediamine and 1,6-hexanediamine; and the like. These can be used alone or in admixture of at least two kinds.

As the stabilizer, there can be cited hindered phenolic radical scavengers such as dibutylhydroxytoluene, pentaerythrityltetrakis-[3-(3,5-di-t-butyl-4-hydroxyphenyl)propionate] and isooctyl-3-(3,5-di-t-butyl-4-hydroxyphenyl)propionate; antioxidants such as phosphorous acid compounds such as phosphorous acid, triphenylphosphite, triethylphosphite and triphenylphosphine; ultraviolet absorbents such as 2-(5-methyl-2-hydroxyphenyl)benzotriazole and a condensation product of methyl-3-[3-t-butyl-5-(2H-benzotriazol-2-yl)-4-hydroxyphenyl]propionate with polyethylene glycol, and the like. These can be used alone or in admixture of at least two kinds. Among these stabilizers, phosphorous acid compounds, especially triphenylphosphite and pentaerythrityltetrakis-[3-(3,5-di-t-butyl-4-hydroxyphenyl)propionate] can be suitably used from the viewpoint of improving the foam strength. Especially, when triphenylphosphite and pentaerythrityltetrakis-[3-(3,5-di-t-butyl-4-hydroxyphenyl)propionate] are used in combination, there is an advantage that the foam strength can be further enhanced.

As the pigment, there can be cited inorganic pigments represented by transition metal salts; organic pigments represented by azo compounds; carbon powder and the like. These pigments can be used alone or in admixture of at least two kinds.

As the flame retardant, there can be cited halogen-based flame retardants such as tris(chloropropyl) phosphate.

As the filler, there can be cited inorganic compounds such as silica fine particles and alumina fine particles, and organic compounds such as melamine resins and phenolic resins.

A polyurethane foam can be formed by, for instance, mixing a polyol component with a blowing agent, the catalyst for producing a polyurethane, a surfactant and other auxiliaries to give a polyol mixture, mixing the resulting polyol mixture with an isocyanate component with stirring with a blowing machine or the like, injecting the mixture into a mold, and allowing the mixture to foam. More specifically, for example, the temperature of the above-mentioned polyol mixture is adjusted to 20° C. or so using a tank, and thereafter the polyol mixture is reacted with the isocyanate component using a foaming machine such as an automatically mixing and injecting foaming machine or an automatically blending and injecting foaming machine, whereby a polyurethane foam can be produced.

As explained above, since the catalyst used for producing a polyurethane of the present invention exhibits little odor, there are exhibited some excellent effects such that the catalyst is highly excellent in working surroundings during the production of the polyurethane, and that odor based on the catalyst for producing a polyurethane is not generated from the polyurethane produced. In addition, when the catalyst for producing a polyurethane of the present invention is used, there can be produced a polyurethane excellent in vinyl-staining resistance, fogging resistance and heat resistance. Therefore, the polyurethane produced by the process of the present invention can be suitably applied directly to the construction site as a heat insulating material for wall surface or ceiling of a house, building or the like. When the catalyst is used for producing a semi-rigid polyurethane foam, the obtained polyurethane can be suitably used for automobile interior materials such as headrests and armrests. In addition, when the catalyst is used for producing a flexible polyurethane foam, since there is generated little odor due to the catalyst, the obtained polyurethane can be suitably used for furnishings, cushioning materials such as beddings, and interior seat cushioning materials for automobiles.

In addition, when the catalyst for producing a polyurethane comprising the DAAA and the FTA compound is used, there can be rapidly produced a polyurethane foam with the generation of little odor based on the catalyst for producing a polyurethane, and being excellent in dimensional stability at low temperatures even in low-temperature surroundings as in winter season. Therefore, the process of the present invention using the catalyst for producing a polyurethane comprising the DAAA and the FTA compound can be especially suitably applied directly to the construction site as a heat insulating material for wall surface or ceiling of a house, building or the like when a heat insulating material made of a polyurethane foam is formed. Further, since little odor based on the catalyst for producing a polyurethane are generated from the produced polyurethane foam, the polyurethane foam can be suitably used as cushioning materials such as headrests, and the like.

EXAMPLE 1 AND COMPARATIVE EXAMPLES 1 TO 4

100 parts by weight of a branched polyether-polyol which is a polypropylene glycol prepared by adding ethylene oxide to the terminal of polypropylene glycol [manufactured by Sumitomo Bayer Urethane Co., LTD. under the trade name of Sumiphen 3063, hydroxyl value: 28 mg KOH/g], 1.5 parts by weight of triethanolamine, 3.6 parts by weight of water as a blowing agent and a catalyst for producing a polyurethane shown in Table 1 (the amount of the catalyst being adjusted so that the gelation time becomes equal in each Example and each Comparative Example) were mixed with each other by a Labomixer to give a polyol mixture.

Next, the resulting polyol mixture and an isocyanate component [manufactured by Sumitomo-Bayer Urethane Co., LTD. under the trade name of Sumidule 44V20] were mixed at 15° C. by a Labomixer with stirring, so that the isocyanate index became 105. 250 g of the resulting mixture was injected into a mold [internal dimensions: 150 mm×150 mm×300 mm (height)], and a free foam of a semi-rigid polyurethane foam was molded.

The odor of the catalyst for producing a polyurethane, and as physical properties of the polyurethane foam, the strength-retaining ratio (heat resistance), the haze value (fogging resistance) and the foam density of the core portion were evaluated on the bases of the following methods. The results are shown in Table 1.

A. Odor of Catalyst for Producing Polyurethane

A 140 ml-glass bottle with a lid was charged with 2 g of a catalyst for producing a polyurethane foam, which was accurately weighed, used in each of Examples and Comparative Examples, and the lid was placed on the bottle. The lidded bottle was allowed to stand in a thermostatic chamber at 25° C. for 20 hours. Thereafter, odor was determined with an odor sensor [manufactured by New Cosmos Electric Co., Ltd., XP-329]. It is indicated in Table 1 that the smaller the numerical value is, the lower the odor is.

B. Strength-Retaining Ratio (Heat Resistance)

After the polyurethane foam was produced, the polyurethane foam was allowed to stand at room temperature for 24 hours. Thereafter, in accordance with JIS K 6301, 10 pieces of Type 2-dumbbell test pieces for determining tensile strength were cut out from the resulting polyurethane foam, and 5 pieces of them were subjected to a test for determining tensile strength using a tensile tester [autograph manufactured by Shimadzu Corporation under the model number of DCS-50M] at a tensile speed of 125 mm/min at room temperature. The average of the tensile strength of the above 5 test pieces was calculated (initial strength). Also, the remaining 5 test pieces were allowed to stand in an atmosphere having a temperature of 120° C. for 24 hours, and these test pieces were subjected to a test for determining tensile strength in the same manner as described above. The average of the tensile strength of these test pieces was calculated (strength at high temperatures). The strength-retaining ratio was obtained from the equation:

[Strength-Retaining Ratio (%)]=[Strength at High Temperatures]÷[Initial Strength]×100, and used as an index for heat resistance.

C. Haze Value (Fogging Resistance)

After the polyurethane foam was produced, the polyurethane foam was allowed to stand at room temperature for 24 hours. Thereafter, a test piece (50 mm×50 mm×100 mm) was cut out from its core portion. The test piece was placed in a 500-ml glass bottle charged with 0.1 ml of 2 N hydrochloric acid, and the opening of the bottle was tightly sealed with a transparent glass plate. About two-third of the glass bottle was dipped in a hot bath kept at 80° C. for 100 hours, and thereafter the haze value of the glass plate was determined by using a haze meter (color difference meter) [manufactured by Nippon Denshoku Kogyo K.K. under the model number of NDH-20D], and used as an index for fogging resistance. It is indicated in Table 1 that the smaller the haze value is, the lower the degree of fogging is.

D. Foam Density of Core Portion

After the free foam of a polyurethane foam was produced, the free foam was allowed to stand for one day. Thereafter, a test piece having a size of 100 mm×100 mm×100 mm was cut out from its core portion. The weight of the test piece was determined, and the foam density of the core portion was calculated from the equation:

[Foam density of core portion]=[Weight of test piece]÷[Volume of test piece]

TABLE 1

| Ex. No. | Catalyst for Producing Polyurethane Kind | Amount (parts by wt.) | Odor | Physical Properties of Polyurethane Foam Strength-Retaining Ratio | Haze Value | Foam Density of Core Portion (kg/m³) |
|---|---|---|---|---|---|---|
| 1 | 5-Dimethyl-3-methyl-1-pentanol | 3.5 | 128 | 80.2 | 0.2 | 53.5 |
| Comp. Ex. 1 | 33.3% Dipropylene Glycol Solution of Triethylene-diamine | 3.4 | 290 | 103.2 | 15.8 | 52.3 |
| Comp. Ex. 2 | N,N,N',N'-tetramethyl-hexanediamine | 2.4 | 380 | 102.2 | 36.0 | 53.6 |
| Comp. Ex. 3 | Trimethyl-aminopropyl-ethanolamine | 3.5 | 553 | 49.0 | 0.7 | 53.1 |
| Comp. Ex. 4 | N,N-dimethyl-cyclohexyl-amine | 4.5 | 1450 | 102.6 | 82.6 | 53.9 |

It can be seen from the results shown in Table 1 that according to Example 1, the working environment during the production of the polyurethane is improved since the catalyst for producing a polyurethane has very weak odor. Also, it can be seen that the polyurethane foam obtained in Example 1 has a relatively high strength-retaining ratio, and fogging is less likely to be generated since its haze value is small at high temperatures (80° C.).

A test for examining the vinyl-staining resistance was not carried out. However, according to Example 1, since the DAAA is used as a catalyst for producing a polyurethane, and the DAAA has dimethylamino group and a primary hydroxyl group in its molecule and is incorporated into the polyurethane foam via chemical bond, the polyurethane foam exhibits the effects similar to the fogging resistance, namely the haze value as to the vinyl-staining resistance. Accordingly, it can be seen from the results of the haze value shown in Table 1 that the polyurethane foam obtained in Example 1 is also excellent in vinyl-staining resistance.

EXAMPLES 2 TO 8 AND COMPARATIVE EXAMPLES 5 TO 9

100 parts by weight of a polyol component [45% by weight of sucrose-based polyether-polyol (hydroxyl value: 380 mg KOH/g, manufactured by Sumitomo Bayer Urethane Co., LTD. under the trade name of Polyol 1703); 45% by weight of tolylenediamine-based polyether-polyol (hydroxyl value: 450 mg KOH/g, manufactured by Asahi Glass Company Ltd. under the trade name of Excenol 455AR); and 10% by weight of glycerol-based polyether-polyol (hydroxyl value: 235 mg KOH/g, manufactured by MITSUI CHEMICALS, INC. under the trade name of Polyol MN-700)], 1.5 parts by weight of a surfactant [manufactured by Nippon Unicar Company Limited under the trade name of L-5340: silicone-based surfactant], 0.5 parts by weight of water and 27.5 parts by weight of HCFC-141b as blowing agents, and a catalyst for producing a polyurethane shown in Table 2 were mixed in a Labomixer, to give a mixture (polyol mixture).

Next, the resulting polyol mixture was mixed with an isocyanate component [manufactured by Sumitomo-Bayer Urethane Co., LTD. under the trade name of Sumidule 44V20] at 5° C. by a Labomixer with stirring, so that the isocyanate index became 105. 250 g of the resulting mixture was injected into a mold [internal dimensions: 150×150×300 (height) mm], and a free foam of a rigid polyurethane foam was molded.

The foam density of the core portion of the obtained rigid polyurethane foam and the odor of the catalyst for producing a polyurethane were evaluated in the same manner as in Example 1. The reactivity during the production of the rigid polyurethane foam, and the dimensional stability (low-temperature shrinkage ratio) at low temperatures of the rigid polyurethane foam were evaluated on the bases of the following methods. The results are shown in Table 2.

E. Reactivity 40 g of the mixture of the polyol mixture and the isocyanate component, obtained in each of Examples and Comparative Examples was poured into a 300 ml-plastic cup, and the time period for reaching cream time (hereinafter referred to as CT) and the time period for reaching the gel time (hereinafter referred to as GT) during free foaming were determined.

F. Dimensional Stability at Low Temperatures

The test piece which was prepared when evaluating the foam density of the core portion was placed in a thermostatic chamber at −5° C., and allowed to stand for 24 hours. Thereafter, as shown in FIG. 1, the dimensional stability in the direction perpendicular to the foaming direction of a test piece 1 was obtained from the equation:

[Dimensional Stability (%)]=[Dimension after allowing to stand−Dimension before allowing to stand]÷[Dimension before allowing to stand]×100

TABLE 2

| Ex. No. | Components of Catalyst for Producing Polyurethane (parts by weight) | | | | Reactivity (sec) CT | GT | Foam Density of Core Portion (kg/m³) | Dimensional Stability (%) | Odor |
|---|---|---|---|---|---|---|---|---|---|
| 2 | DMAMP | (1.0) | 3-Dimethylaminopropylamine | (3.0) | 13 | 47 | 30.9 | −2.2 | 724 |
| 3 | DMAMP | (2.0) | 3-Dimethylaminopropylamine | (2.0) | 15 | 48 | 30.7 | −2.9 | 262 |
| 4 | DMAMP | (3.0) | 3-Dimethylaminopropylamine | (1.0) | 16 | 49 | 30.6 | −3.3 | 161 |
| 5 | DMAMP | (0.5) | 3-Dimethylaminopropylamine | (3.5) | 12 | 46 | 31.2 | −2.0 | 820 |
| 6 | DMAMP | (2.0) | 4-Dimethylaminobutylamine | (2.0) | 15 | 48 | 31.2 | −2.6 | 343 |
| 7 | DMAMP | (2.0) | 6-Dimethylaminohexylamine | (2.0) | 16 | 49 | 31.1 | −2.8 | 307 |

TABLE 2-continued

| Ex. No. | Components of Catalyst for Producing Polyurethane (parts by weight) | | | | Reactivity (sec) CT | GT | Foam Density of Core Portion (kg/m³) | Dimensional Stability (%) | Odor |
|---|---|---|---|---|---|---|---|---|---|
| 8 | DMAMP | (2.0) | 3-(2-Dimethylaminoethoxy)-propylamine | (2.0) | 16 | 49 | 30.5 | −3.9 | 290 |
| Comp. Ex. 5 | DMAMP | (4.0) | — | | 18 | 53 | 31.0 | −7.7 | 128 |
| Comp. Ex. 6 | — | | 3-Dimethylaminopropylamine | (4.0) | 12 | 45 | 30.7 | −2.1 | 2000< |
| Comp. Ex. 7 | — | | 4-Dimethylaminobutylamine | (4.0) | 12 | 46 | 30.6 | −3.0 | 2000< |
| Comp. Ex. 8 | — | | 6-Dimethylaminohexylamine | (4.0) | 13 | 47 | 30.3 | −2.8 | 2000< |
| Comp. Ex. 9 | — | | 3-(2-Dimethylaminoethoxy)-propylamine | (4.0) | 13 | 47 | 30.1 | −3.1 | 2000< |

(Note) DMAMP: 5-Dimethylamino-3-methyl-1-pentanol

It can be seen from the results shown in Table 2 that according to Examples 2 to 8, the reactivity during the production of the polyurethane foam is excellent since CT and GT are short periods of time nevertheless the molding is carried out at low temperatures, and the dimension stability at low temperatures is excellent since there is little change in dimensions. Also, it can be seen that there can be obtained polyurethane foams generating little odor based on the catalyst for producing a polyurethane since a catalyst having dimethylamino group and a primary amino group or hydroxyl group in its molecule is used and the catalyst itself is non-transferable from the polyurethane foam.

INDUSTRIAL APPLICABILITY

When the catalyst for producing a polyurethane comprising the DAAA is used, there can be produced a polyurethane having little odor and being excellent in vinyl-staining property, fogging resistance and heat resistance. In addition, when the catalyst for producing a polyurethane comprising the DAAA and the FTA is used, there can be rapidly produced a polyurethane foam excellent in dimensional stability even in low-temperature surroundings with generating little odor during the production of the polyurethane foam.

What is claimed is:

1. A catalyst for producing a polyurethane, comprising a dialkylaminoalkyl alcohol represented by the formula (I):

$$R^1R^2N-X-OH \qquad (I)$$

wherein each of $R^1$ and $R^2$ is independently an alkyl group having 1 to 4 carbon atoms; and X is a branched alkylene group having 4 to 8 carbon atoms.

2. The catalyst for producing a polyurethane according to claim 1, wherein the compound represented by the formula (I) is 5-dimethylamino-3-methyl-1-pentanol.

3. A process for producing a polyurethane, comprising reacting a polyol component with an isocyanate component in the presence of a catalyst for producing a polyurethane comprising a dialkylaminoalkyl alcohol represented by the formula (I):

$$R^1R^2N-X-OH \qquad (I)$$

wherein each of $R^1$ and $R^2$ is independently an alkyl group having 1 to 4 carbon atoms; and X is a branched alkylene group having 4 to 8 carbon atoms.

4. The process for producing a polyurethane foam according to claim 3, wherein the polyol component is reacted with the isocyanate component in the presence of a catalyst for producing a polyurethane, comprising a dialkylaminoalkyl alcohol represented by the formula (I), and a blowing agent.

5. The process according to claim 3 or 4, wherein the dialkylaminoalkyl alcohol represented by the formula (I) is 5-dimethylamino-3-methyl-1-pentanol.

6. A process for producing a polyurethane foam, comprising reacting a polyol component with an isocyanate component in the presence of a catalyst for producing a polyurethane, comprising a dialkylaminoalkyl alcohol represented by the formula (I):

$$R^1R^2N-X-OH \qquad (I)$$

wherein each of $R^1$ and $R^2$ is independently an alkyl group having 1 to 4 carbon atoms; and X is a branched alkylene group having 4 to 8 carbon atoms, and a compound having a primary amino group and a tertiary amino group in its molecule, and a blowing agent.

7. The process according to claim 6, wherein the dialkylaminoalkyl alcohol represented by the formula (I) is 5-dimethylamino-3-methyl-1-pentanol.

8. The process according to claim 6 or 7, wherein the compound having a primary amino group and a tertiary amino group in its molecule is represented by the formula (II):

$$R^3R^4N-(CH_2)_m-A-(CH_2)_n-NH_2 \qquad (II)$$

wherein each of $R^3$ and $R^4$ is independently an alkyl group having 1 to 4 carbon atoms, or may be bonded to each other to form a 3- to 6-membered nitrogen atom-containing heterocyclic group; A is oxygen atom or a single bond, and when A is oxygen atom, each of m and n is independently an integer of 2 to 6, and when A is a single bond, each of m and n is an integer satisfying m+n=2 to 8.

9. The process according to any one of claims 6 to 7, wherein the compound having a primary amino group and a tertiary amino group in its molecule is at least one compound selected from the group consisting of 3-dimethylaminopropylamine, 4-dimethylaminobutylamine, 6-dimethylaminohexylamine and 3-(2-dimethylaminoethoxy) propylamine.

10. The process according to any one of claims 6 to 7, wherein the dialkylaminoalkyl alcohol represented by the formula (I)/the compound having a primary amino group and a tertiary amino group in its molecule [weight ratio] is 5/95 to 95/5.

* * * * *